US008935554B2

(12) United States Patent
Yanase et al.

(10) Patent No.: US 8,935,554 B2
(45) Date of Patent: Jan. 13, 2015

(54) HAND HELD ELECTRONIC DEVICE WITH USER CONTROLLED POWER SAVING FEATURE (75) Inventors: Kazuhiro Yanase, Kanagawa (JP); Takeshi Kono, Tokyo (JP); Motoki Kobayashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 234 days.

(21) Appl. No.: 13/394,592

(22) PCT Filed: Aug. 25, 2010

(86) PCT No.: PCT/JP2010/005230
§ 371 (c)(1),
(2), (4) Date: May 16, 2012

(87) PCT Pub. No.: WO2011/033726
PCT Pub. Date: Mar. 24, 2011

(65) Prior Publication Data
US 2012/0239955 A1   Sep. 20, 2012

(30) Foreign Application Priority Data
Sep. 18, 2009   (JP) .................................. 2009-217882

(51) Int. Cl.
*G06F 1/00* (2006.01)
*G06F 1/16* (2006.01)
*G06F 1/32* (2006.01)

(52) U.S. Cl.
CPC ............ *G06F 1/1677* (2013.01); *G06F 1/1624* (2013.01); *G06F 1/3203* (2013.01); *A63F 2300/1043* (2013.01); *A63F 2300/204* (2013.01); *A63F 2300/636* (2013.01)
USPC ........................................................ 713/323

(58) Field of Classification Search
USPC ........................................................ 713/323
See application file for complete search history.

(56) References Cited

U.S. PATENT DOCUMENTS
5,978,923 A * 11/1999 Kou .............................. 713/323
7,076,058 B2    7/2006 Ikeuchi
(Continued)

FOREIGN PATENT DOCUMENTS
CN    1428989 A    7/2003
CN    1925511 A    3/2007
(Continued)

OTHER PUBLICATIONS
Office Action for corresponding KR application No. 10-2012-7009512, dated Jul. 29, 2013.
(Continued)

*Primary Examiner* — Vincent Tran
(74) *Attorney, Agent, or Firm* — Matthew B. Dernier, Esq.; Gibson & Dernier LLP (57) ABSTRACT An opening/closing detection unit detects a transition of an electronic device from an open state to a closed state or from the closed state to the open state. An electrical-power control unit sets an operation mode of an application processing unit that executes an application. When a transition from the open state to the closed state is detected while a hold switch is in an OFF state, the electrical-power control unit switches an operation mode of an application processing unit from a normal mode to a sleep mode. On the other hand, when a transition from the open state to the closed state is detected while the hold switch is in an ON state, the electrical-power control unit does not switch the operation mode of the application processing unit from the normal mode to the sleep mode.

6 Claims, 6 Drawing Sheets

(56) References Cited

U.S. PATENT DOCUMENTS

| | | | |
|---|---|---|---|
| 7,792,557 B2 | 9/2010 | Mizuta | |
| 2003/0171133 A1 | 9/2003 | Mizuta | |
| 2003/0202656 A1 | 10/2003 | Ikeuchi | |
| 2004/0056651 A1* | 3/2004 | Marietta Bersana | 324/207.2 |
| 2004/0204202 A1 | 10/2004 | Shimamura | |
| 2006/0047980 A1* | 3/2006 | Price et al. | 713/300 |
| 2007/0060217 A1 | 3/2007 | Kim | |
| 2009/0051357 A1* | 2/2009 | Sasaki | 324/228 |
| 2009/0066165 A1* | 3/2009 | Luo et al. | 307/115 |
| 2009/0280872 A1* | 11/2009 | Kajiya et al. | 455/574 |
| 2010/0046149 A1* | 2/2010 | Wang et al. | 361/679.01 |
| 2010/0056272 A1* | 3/2010 | Dutilly et al. | 463/30 |
| 2010/0197370 A1* | 8/2010 | Fyke | 455/575.4 |

FOREIGN PATENT DOCUMENTS

| | | |
|---|---|---|
| JP | 08203200 A | 8/1996 |
| JP | 2003289348 A | 10/2003 |
| JP | 2003319044 A | 11/2003 |
| JP | 2004117436 A | 4/2004 |
| JP | 2005136778 A | 5/2005 |
| JP | 2007013302 A | 1/2007 |
| KR | 1020030078077 A | 10/2003 |
| WO | 2008025367 A1 | 3/2008 |

OTHER PUBLICATIONS

International Search Report for corresponding PCT application PCT/JP2010/005230, dated Oct. 26, 2010.

International Preliminary Report on Patentability and written Opinion for corresponding PCT application PCT/JP2010/005230, dated Apr. 11, 2012.

Office Action for corresponding JP application No. 2009-217882, dated Oct. 26, 2011.

Examination Report issued for corresponding Australian Patent Application No. 2010296787, dated Feb. 21, 2013.

Office Action for corresponding CN application No. 201080041268, dated Nov. 29, 2013.

* cited by examiner

HAND HELD ELECTRONIC DEVICE WITH USER CONTROLLED POWER SAVING FEATURE

TECHNICAL FIELD

The present invention relates to an electronic device, and particularly to a portable electronic device provided with two housings.

BACKGROUND ART

At least an operation key and a display are provided to electronic devices such as game devices, PDA's (Personal Digital Assistant), and the like. In order to achieve size reduction in electronic devices without sacrificing the size of a display, electronic devices are in practical use that have operation keys and displays provided on each of separate housings that are slidably connected together. In the electronic devices, the operation keys provided on a lower housing become exposed by sliding the lower housing against an upper housing from a state where the upper housing and the lower housing are completely overlapped so that a user can use the operation keys on the lower housing.

In such slidable electronic devices, a user cannot operate the operation keys when the upper housing and the lower housing are completely overlapped since the operation keys are not exposed to the outside. Since portable electronic devices are battery-powered, it is preferred to stop supply of electrical power to a CPU (Central Processing Unit), which performs applications, by changing an operation mode to a sleep mode in order to reduce power consumption in such a case. However, it is sometimes preferred to continue executing the application, such as music playing application, which does not basically require key operation, without changing the mode to the sleep mode even when the operation keys provided on the lower housing are not exposed to the outside.

SUMMARY OF THE INVENTION

A purpose of the present invention is to provide an electronic device that allows for setting whether or not there is to be a transition to a sleep mode through user's operation.

An electronic device according to one embodiment of the present invention is provided with an upper housing and a lower housing, wherein the upper housing and the lower housing are slidably connected such that an operation key provided on a front face of the lower housing can be in at least two states: an open state where the operation key is exposed to the outside; and a closed state where the operation key is not exposed to the outside, and comprises: an opening/closing detection unit configured to detect a transition of the state of the electronic device; an application processing unit configured to execute an application; an electrical-power control unit configured to set an operation mode of the application processing unit; and an operation switch configured to be operated by a user. When a transition from the open state to the closed state is detected while the operation switch is in an OFF state, the electrical-power control unit switches the operation mode of the application processing unit from a normal mode to a sleep mode, and when a transition from the open state to the closed state is detected while the operation switch is in an ON state, the electrical-power control unit does not switch the operation mode of the application processing unit from the normal mode to the sleep mode.

Optional combinations of the aforementioned constituting elements and implementations of the invention in the form of methods, apparatuses, systems, recording mediums, and computer programs may also be practiced as additional modes of the present invention.

DETAILED DESCRIPTION OF THE INVENTION

Figure 1A:
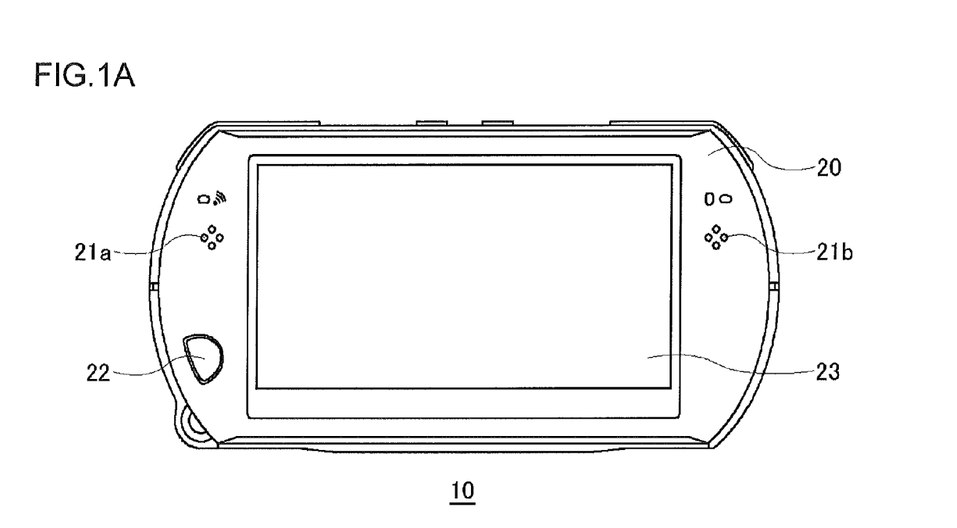
FIG. 1 is a diagram illustrating the exterior configuration of a portable electronic device according to the present embodiment.
Figure 1B:
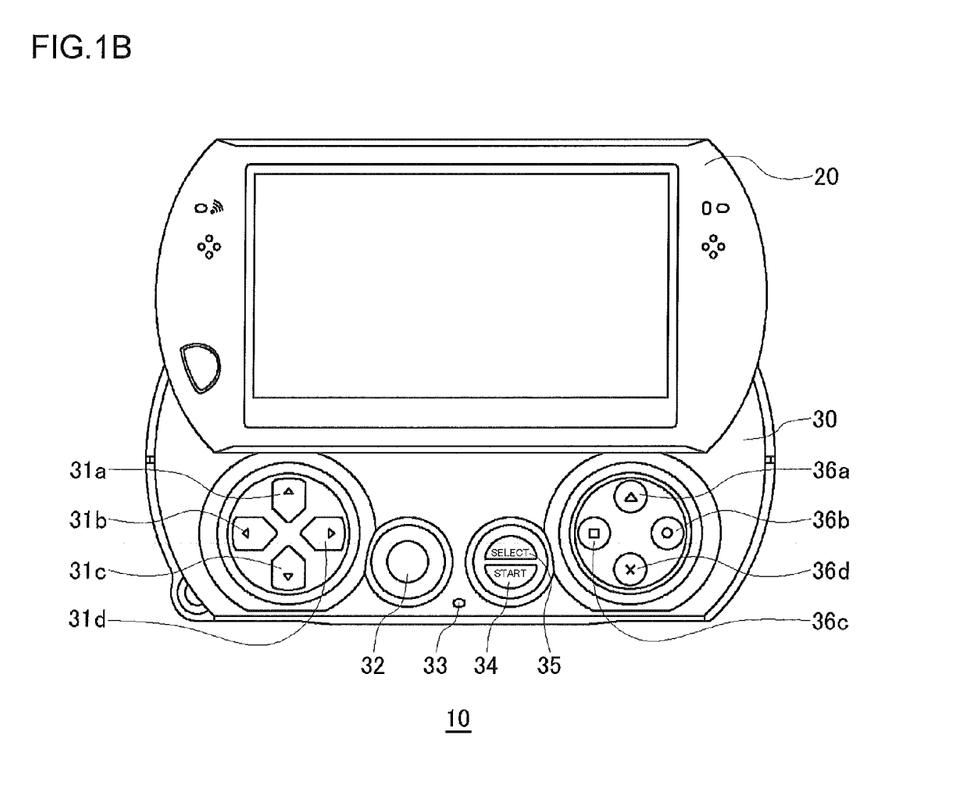

FIG. 1 illustrates the exterior configuration of a portable electronic device 10 according to the present embodiment. The electronic device 10 is provided with an upper housing 20 and a lower housing 30 that are slidably connected. FIG. 1A is a front view when the electronic device 10 is in a first state (a closed state), and FIG. 1B is a front view when the electronic device 10 is in a second state (an open state). In the state where the electronic device 10 is closed, the upper housing 20 almost completely overlaps the lower housing 30 above the lower housing 30, and operation keys provided on the front face of the lower housing 30 are not exposed to the outside. When the lower housing 30 is slid against the upper housing 20 from the closed state, the electronic device 10 becomes open where the operation keys provided on the front face of the lower housing 30 are exposed to the outside.

On the front face of the upper housing 20, a left speaker 21a, a right speaker 21b, an operation button 22, and a display 23 are provided. A slide mechanism (not shown) that slidably connects the upper housing 20 and the lower housing 30 is provided between the back face of the upper housing 20 and the front face of the lower housing 30.

In the open state shown in FIG. 1B, directional keys 31a, 31b, 31c, and 31d (hereinafter, generically referred to as "directional keys 31"), an analog pad 32, a microphone 33, a START button 34, a SELECT button 35, operation buttons 36a, 36b, 36c, and 36d (hereinafter, generically referred to as "operation buttons 36") that are provided on the front face of the lower housing 30 are exposed to the outside. The operation keys such as the directional keys 31, the analog pad 32, the START button 34, the SELECT button 35, and the operation buttons 36 become operable when the electronic device 10 becomes open.

Figure 2A:
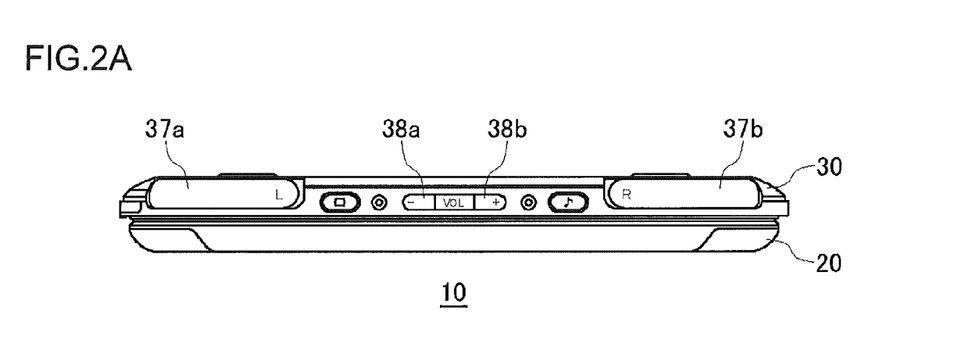
FIG. 2 is a diagram illustrating the exterior configuration of the electronic device.
Figure 2B:
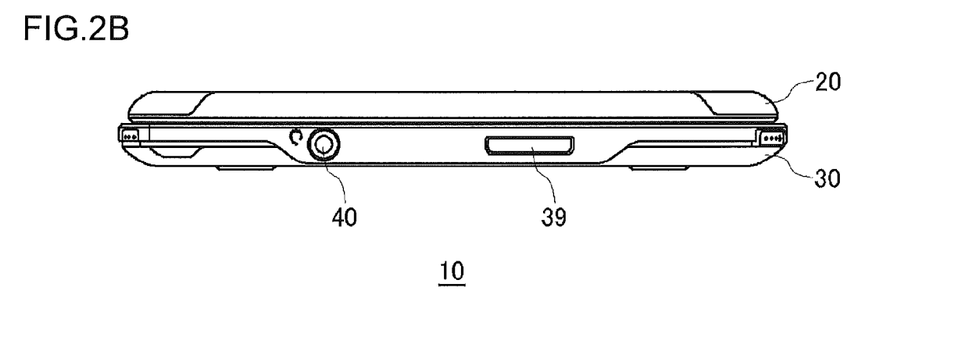

FIG. 2 illustrates the exterior configuration of the electronic device 10. In FIG. 2, the electronic device 10 is in the closed state. FIG. 2A is a top view of the electronic device 10, and FIG. 2B is a bottom view of the electronic device 10. A left button 37a, a right button 37b, and volume buttons 38a and 38b are provided on the top face of the lower housing 30. A connection terminal 39 and a headphone/microphone terminal 40 are provided on the bottom face of the lower housing 30. The connection terminal 39 is used for connection with external devices.

Figure 3A:
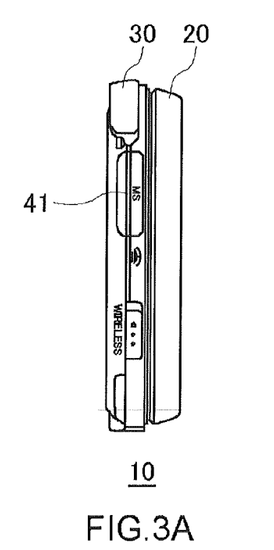
FIG. 3 is a diagram illustrating the exterior configuration of the electronic device.
Figure 3B:
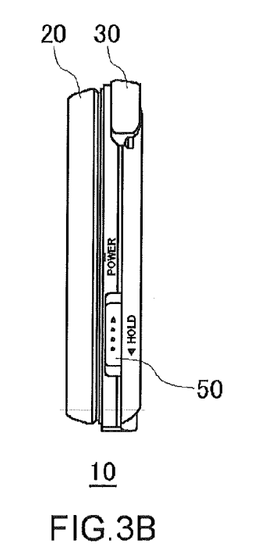

FIG. 3 illustrates the exterior configuration of the electronic device 10. In FIG. 3, the electronic device 10 is in the closed state. FIG. 3A is a left side face view of the electronic device 10, and FIG. 3B is a right side face view of the electronic device 10. A media card slot 41 is provided on the left side face of the lower housing 30, and a hold switch 50 is provided on the right side face of the lower housing 30.

In the electronic device 10, the operation button 22 that is provided on the front face of the upper housing 20, the directional keys 31, the analog pad 32, the START button 34, the SELECT button 35, and the operation buttons 36 that are provided on the front face of the lower housing 30, the left button 37a and the right button 37b that are provided on the top face of the lower housing 30 are operation keys that are operated by the user. The hold switch 50 is moved between OFF and ON positions by the user. When the hold switch 50 is moved to the ON position, reception of an operation input entered to an operation key by the user is disabled. When the electronic device 10 is in the closed state, while the operation keys provided on the front face of the lower housing 30 are not exposed to the outside, the operation button 22, the left button 37a, and the right button 37b are always exposed to the outside. Therefore, when ending the use of the electronic device 10, the user can disable key operations on the operation button 22, the left button 37a, and the right button 37b by moving the hold switch 50 to the ON position so as to prevent unintended erroneous operation on the operation keys.

The electronic device 10 may be a game device. When the electronic device 10 is used as a game device, the user executes a game application while the electronic device 10 is in the open state. A game image is displayed on the display 23, allowing the user to enjoy a game by operating the directional keys 31, the operation buttons 36, or the like while grasping the electronic device 10. When the user stops playing the game, the user closes the electronic device 10. Since the electronic device 10 is battery-powered, it is preferred to ensure power saving by switching an operation mode from a normal mode to a sleep mode in order to reduce power consumption when the electronic device 10 is in the closed state.

In recent years, electronic devices have been developed to be multifunctional. For example, there are more occasions where a music reproduction function is incorporated in electronic devices such as portable phones. The electronic device 10 according to the present embodiment may also be formed to have a music reproduction function in addition to a game execution function. When the electronic device 10 is used as a music reproduction device, it is assumed that the mode of use thereof is different from that of a game device. In other words, when the electronic device 10 is used as a game device, the user operates the operation keys while grasping the electronic device 10. When the electronic device 10 is used as a music reproduction device, the mode of use is assumed where the user puts the electronic device 10 in a bag, a clothes pocket, or the like instead of grasping the electronic device 10 and listens to music with use of earphones, headphones, etc.

It is considered that the electronic device 10 is normally in the closed state when used as a music reproduction device as described above. It is not preferred to always change the operation mode to the sleep mode when the electronic device 10 is closed since a music reproduction application will also be ended. The electronic device 10 according to the present embodiment allows for a setting of whether or not there is to be a transition to the sleep mode by a simple switch operation by the user.

Figure 4:
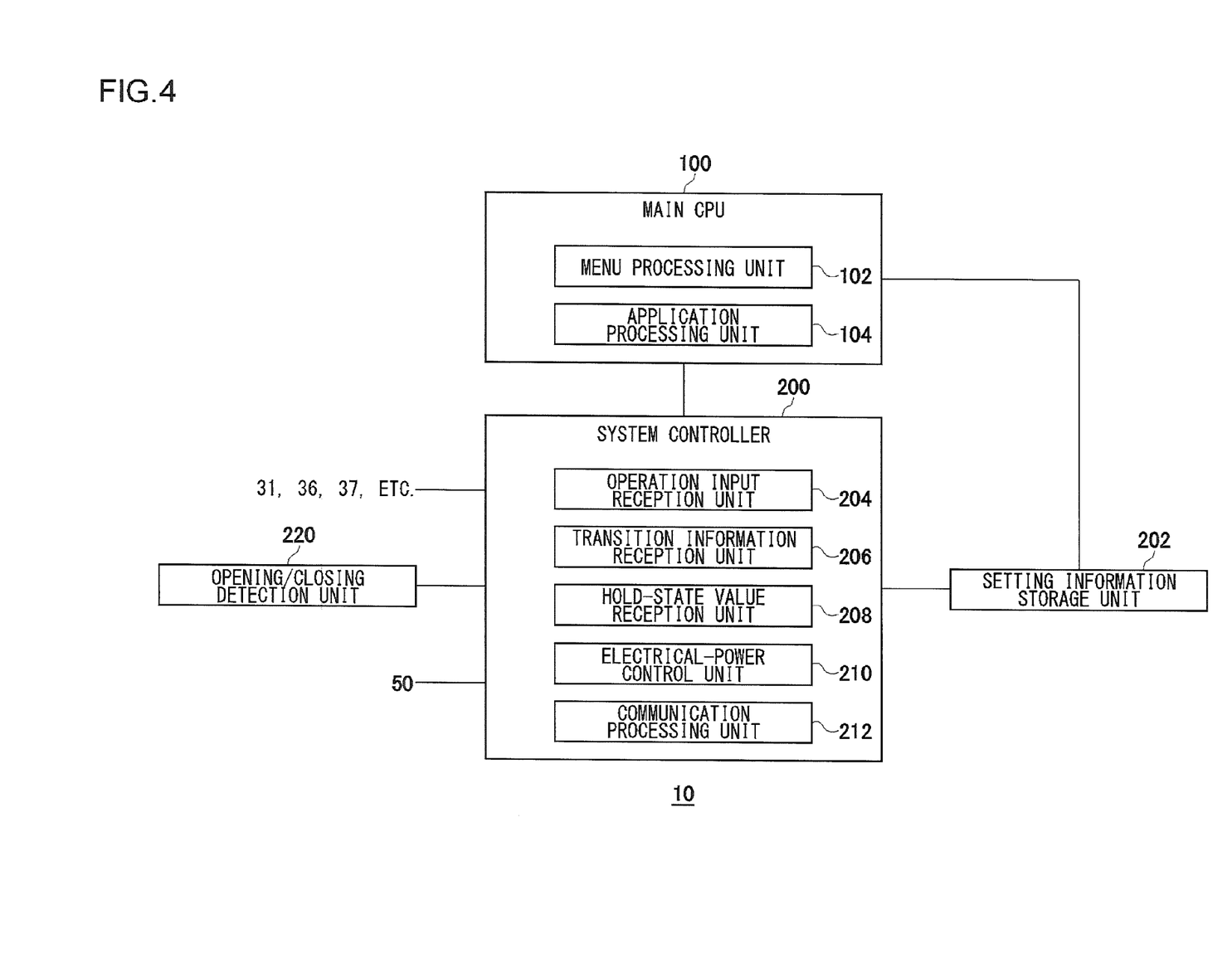
FIG. 4 is a diagram illustrating the interior configuration of the electronic device.

FIG. 4 illustrates the internal configuration of the electronic device 10. The electronic device 10 is provided with a main CPU 100 and a system controller 200. The main CPU 100 and the system controller 200 are formed on separate chips and receive supply of electrical power from a battery through different respective systems. The main CPU 100 has a menu processing unit 102 for generating a menu screen for the user to set the information of the electronic device 10 (main body information) and to select an application, and an application processing unit 104 for executing the application. The electronic device 10 is provided with a setting information storage unit 202 for storing the information of the electronic device 10 set by the user and an opening/closing detection unit 220 for detecting a state transition of the electronic device 10.

The system controller 200 performs a state detection function for the various operation keys, a communication processing function, and an electrical-power control function independently of the main CPU 100. More specifically, the system controller 200 has an operation input reception unit 204, a transition information reception unit 206, a hold-state value reception unit 208, an electrical-power control unit 210, and a communication processing unit 212.

The functions of the system controller 200 are implemented by any CPU, memory or a program loaded into the memory. Configurations are implemented by the cooperation of them. Thus, a person skilled in the art should appreciate that there are many ways of accomplishing these functional blocks in various forms in accordance with the components of hardware only, software only, or the combination of both.

As described above, in the electronic device 10 that is in the closed state, it is preferred to set the operation mode of the main CPU 100 to be a sleep mode in principle so as to achieve power saving except for when a music reproduction application or the like is being executed. However, there may be occasions where some users desire current time information, etc., to be displayed when the electronic device 10 is in the closed state. Thus, the electronic device 10 according to the present embodiment allows the user to register, in advance, the operation of the electronic device 10 during the closed state as the information of the electronic device 10.

Figure 5:
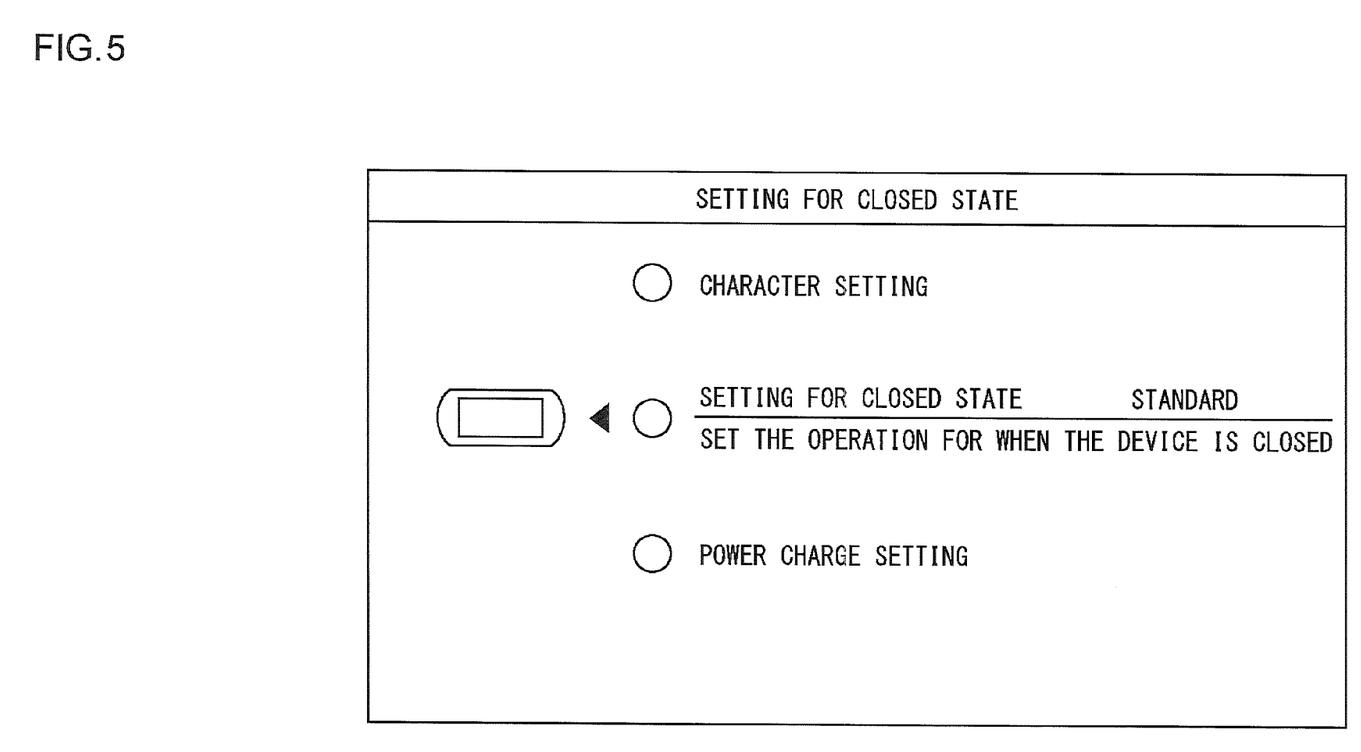
FIG. 5 is a diagram illustrating an example of a screen for setting the operation of the electronic device during a closed state.

FIG. 5 is a diagram illustrating an example of a screen for setting the operation of the electronic device 10 during the closed state. The menu processing unit 102 generates a setting screen shown in FIG. 5 when the user performs a setting process of the information of the electronic device 10. When the user presses down the operation button 36b in the setting screen, the operation input reception unit 204 receives a pressing input on the operation button 36b and provides the pressing input to the menu processing unit 102. The menu processing unit 102 generates a selection screen with setting items prepared for an information item "SETTING FOR CLOSED STATE" of the electronic device 10. In the setting screen shown in FIG. 5, a state is shown where a "STANDARD" item is being selected as default for the setting item.

Figure 6:
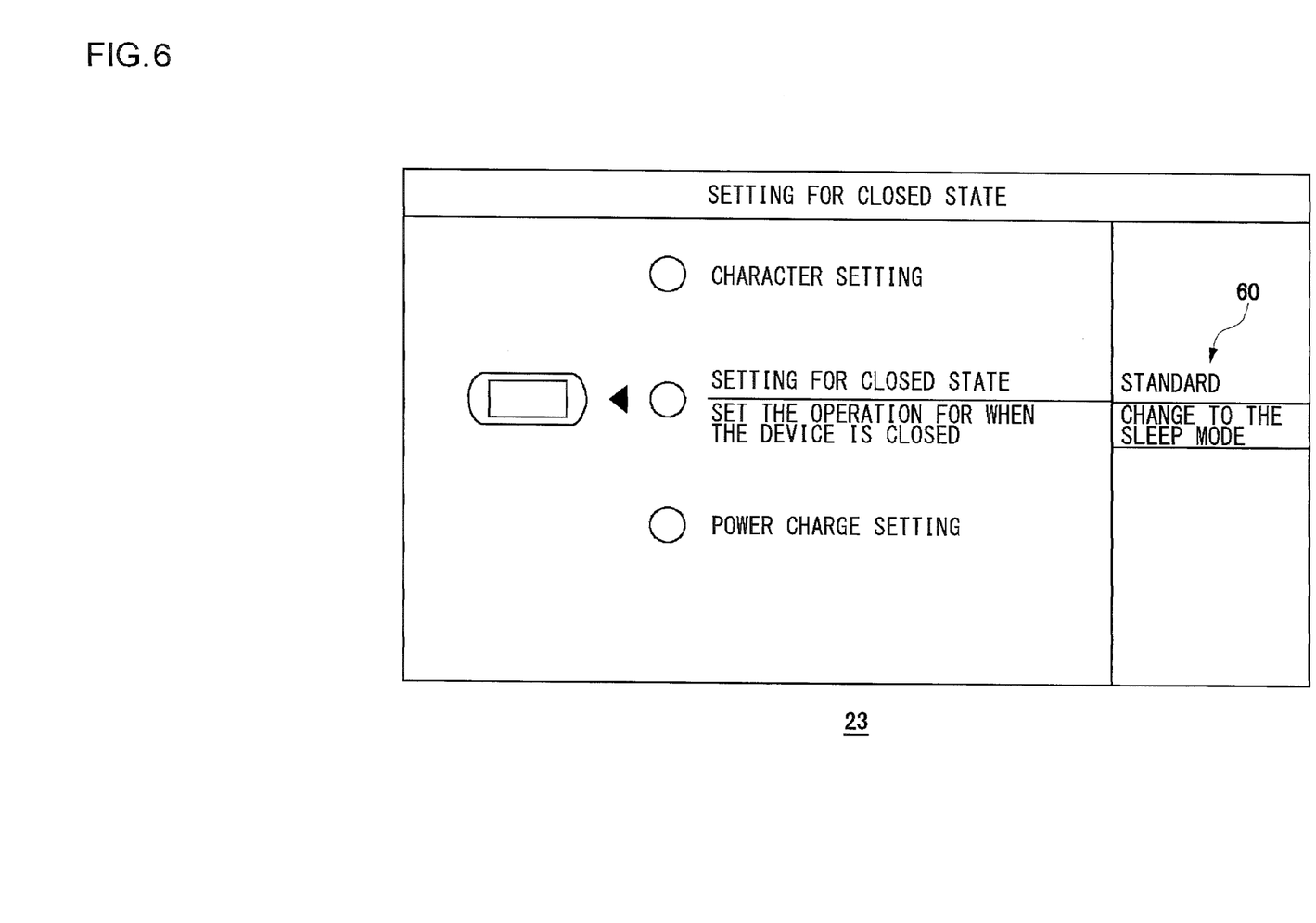
FIG. 6 is a diagram illustrating a selection screen for setting items.

FIG. 6 illustrates a selection screen 60 for the setting item. The selection screen 60 shows two selections: a "STANDARD" item and a "CHANGE TO THE SLEEP MODE" item. When the "STANDARD" setting item is selected, the application processing unit 104 executes an application for displaying a clock showing the current time information on the display 23 at the time when the electronic device 10 is changed from the open state to the closed state. When the "CHANGE TO THE SLEEP MODE" setting item is selected, a sleep mode is executed where the electrical power supply to the main CPU 100 is stopped at the time when the electronic device 10 is changed from the open state to the closed state. When the electronic device 10 is changed from the closed state to the open state during the execution of the sleep mode, the electrical power supply to the main CPU 100 is restarted, and the main CPU 100 is thus resumed. The setting item selected by the user is stored in the setting information storage unit 202 as the information of the electronic device 10. Hereinafter, an explanation is given of a situation where the "CHANGE TO THE SLEEP MODE" item is selected by the user.

Referring back to FIG. 4, in the system controller 200, the transition information reception unit 206 receives from the opening/closing detection unit 220 transition information indicating that the electronic device 10 has transitioned from the open state to the closed state or from the closed state to the open state. The upper housing 20 and the lower housing 30 are slidably connected by the slide mechanism, and the opening/closing detection unit 220 may be formed to have a magnetic sensor provided in the slide mechanism. When the electronic device 10 transitions from the open state to the closed state or from the closed state to the open state, the opening/closing detection unit 220 outputs transition information indicating that the transition has occurred. For example, the opening/closing detection unit 220 may output transition information of a signal value of 0 when the electronic device 10 transitions from the open state to the closed state and may output transition information of a signal value of 1 when the electronic device 10 transitions from the closed state to the open state. The transition information reception unit 206 receives from the opening/closing detection unit 220 the transition information and then determines whether the electronic device 10 has transitioned to the closed state or to the open state.

The opening/closing detection unit 220 may output to the transition information reception unit 206 state information indicating whether the electronic device 10 is in the open state or in the closed state. For example, the opening/closing detection unit 220 outputs to the transition information reception unit 206 a state value 0 during the closed state and a state value of 1 during the open state. The transition information reception unit 206 may determine that a state transition has occurred when the state information is changed at this time. In this case, the opening/closing detection unit 220 and the transition information reception unit 206 achieve a function of detecting the transition of the state of the electronic device 10 in cooperation with each other.

The electrical-power control unit 210 monitors the transition information received by the transition information reception unit 206 or a determination result from the transition information reception unit 206. The information of the electronic device 10 in which the item "CHANGE TO THE SLEEP MODE" is set for when the electronic device 10 is in the closed state is stored in the setting information storage unit 202. The electrical-power control unit 210 switches the operation mode of the main CPU 100 from the normal mode to the sleep mode in principle when transition from the open state to the closed state is detected. The normal mode is an operation mode where electrical power is supplied to the main CPU 100, and the sleep mode is an operation mode where the electrical power supply to the main CPU 100 is stopped. Power saving can be achieved by setting the operation mode to the sleep mode.

Described above is basic electrical power control in the electronic device 10. In the electronic device 10 according to the present embodiment, even in a case where the information of the electronic device 10 in which the "CHANGE TO THE SLEEP MODE" is set when the electronic device 10 is in the closed state is stored in the setting information storage unit 202, control for prohibiting the transition to the sleep mode is performed, without changing the information of the electronic device 10, according to the state of operating an operation switch by the user even when the transition from the open state to the closed state is detected.

The hold-state value reception unit 208 receives a state value of the hold switch 50. The state value of the hold switch 50 is a value that indicates the ON or OFF state of the hold switch 50. A state value that indicates the ON state serves as a signal that instructs the operation input reception unit 204 to disable the reception of an operation input through the operation keys. When the hold-state value reception unit 208 receives a state value indicating the ON state of the hold switch 50, the operation input reception unit 204 disables the reception of an operation input through the operation keys. This prevents the user from effectively operating the operation keys provided in the electronic device 10.

Instead of the state value of the hold switch 50, the hold-state value reception unit 208 may receive a signal indicating that the state of the hold switch 50 has been switched. When moved to the OFF position from the ON position by the user or when moved to the ON position from the OFF position, the hold switch 50 outputs switching information to the hold-state value reception unit 208 indicating that the hold switch 50 has been switched. When the hold-state value reception unit 208 receives the switching information indicating that the position of the hold switch 50 has been switched from the OFF position to the ON position, the operation input reception unit 204 disables the reception of an operation input through the operation keys.

When the transition from the open state to the closed state is detected by the opening/closing detection unit 220 and/or the transition information reception unit 206 while the hold switch 50 is in the OFF state, the electrical-power control unit 210 switches the operation mode of the main CPU 100 from the normal mode to the sleep mode. On the other hand, when the transition from the open state to the closed state is detected by the opening/closing detection unit 220 and/or the transition information reception unit 206 while the hold switch 50 is in the ON state, the electrical-power control unit 210 does not switch the operation mode of the main CPU 100 from the normal mode to the sleep mode and maintains the normal mode. This allows the application processing unit 104 to continue executing an application that is being executed even when the electronic device 10 is in the closed state.

When the hold switch 50 is in the ON state, the operation input reception unit 204 disables the reception of an operation input through the operation keys. Similarly, the transition information reception unit 206 also disables the reception of the transition information output from the opening/closing detection unit 220. Therefore, even when the electronic device 10 has transitioned from the open state to the closed state, the electrical-power control unit 210 does not recognize the transition since the reception of the transition information is disabled. Therefore, even when the transition from the open state to the closed state is detected by the opening/closing detection unit 220 and/or the transition information reception unit 206, the electrical-power control unit 210 does not recognize the transition and performs electrical power control where the operation mode is not switched to the sleep mode so as to maintain the normal mode.

Separately to the process of disabling the reception of the transition information by the transition information reception unit 206 that is described above, the electrical-power control unit 210 may monitor the state value received by the hold-state value reception unit 208. Even when the information of the electronic device 10 in which the "CHANGE TO THE SLEEP MODE" is set for when the electronic device 10 is in the closed state is stored in the setting information storage unit 202, the electrical-power control unit 210 may maintain the normal mode without switching the operation mode of the main CPU 100 from the normal mode to the sleep mode as long as the hold switch 50 is in the ON state when the transition from the open state to the closed state is detected. This allows the application processing unit 104 to continue executing an application that is being executed even when the electronic device 10 is in the closed state.

Assigning a function of setting the operation mode by the user to the hold switch 50 allows the resources of the electronic device 10 to be effectively used. It is often preferred to disable the operation of the operation keys when the electronic device 10 is in the closed state. Particularly, in a music reproduction application, there are few situations where the user operates the operation keys. Therefore, assigning the function of setting the operation mode to the hold switch 50 allows the operation of the operation keys to be disabled and the transition to the sleep mode to be prohibited all by a single operation of the hold switch 50. Thus, a preferred environment can be easily provided for an application that does not basically require key operation.

As described above, when the hold switch 50 is in the ON state, the electrical-power control unit 210 does not switch the operation mode of the main CPU 100, which includes the application processing unit 104, from the normal mode to the sleep mode even when the transition from the open state to the closed state is detected, in the electronic device 10 according to the present embodiment. As described, the electronic device 10 according to the present embodiment has the advantage of being able to easily control, by setting ON/OFF of the hold switch 50 by the user, whether or not an application being executed is to be continued when the electronic device 10 is in the closed state.

When the hold switch 50 is in the ON state, the main CPU 100 continues the execution of the application even during the closed state. However, the reception of an operation input through the operation keys provided in the electronic device 10 is disabled. Therefore, a remote controller for operation input may be prepared so that the communication processing unit 212 receives an operation input from the remote controller. This allows the user to freely operate a music reproduction application. Whether or not a remote controller can be used may be determined for each application. Even when the hold switch 50 is turned to an OFF state at this time, the electrical-power control unit 210 does not switch the operation mode of the main CPU 100 to the sleep mode since there is no transition caused in the state of the electronic device 10.

In the electronic device 10 according to the present embodiment, when the hold switch 50 is in the OFF state, the operation mode transitions to the sleep mode when the state is changed from the open state to the closed state. When the electronic device 10 is changed from the closed state to the open state during the execution of the sleep mode, the electrical power supply to the main CPU 100 is restarted, and the main CPU 100 is thus resumed.

An explanation is given of the operation of the electronic device 10 when the hold switch 50 is moved from the OFF position to the ON position during the sleep mode. When the hold switch 50 is in the ON state, the transition information reception unit 206 disables the reception of transition information. Therefore, even when the electronic device 10 transitions from the closed state to the open state, the electrical-power control unit 210 does not recognize the transition since the reception of the transition information is disabled. Therefore, even when the transition from the closed state to the open state is detected by the opening/closing detection unit 220 and/or the transition information reception unit 206, the electrical-power control unit 210 does not recognize the transition and thus does not switch the operation mode to the normal mode. Thus, the main CPU 100 is not resumed.

Figure 7:
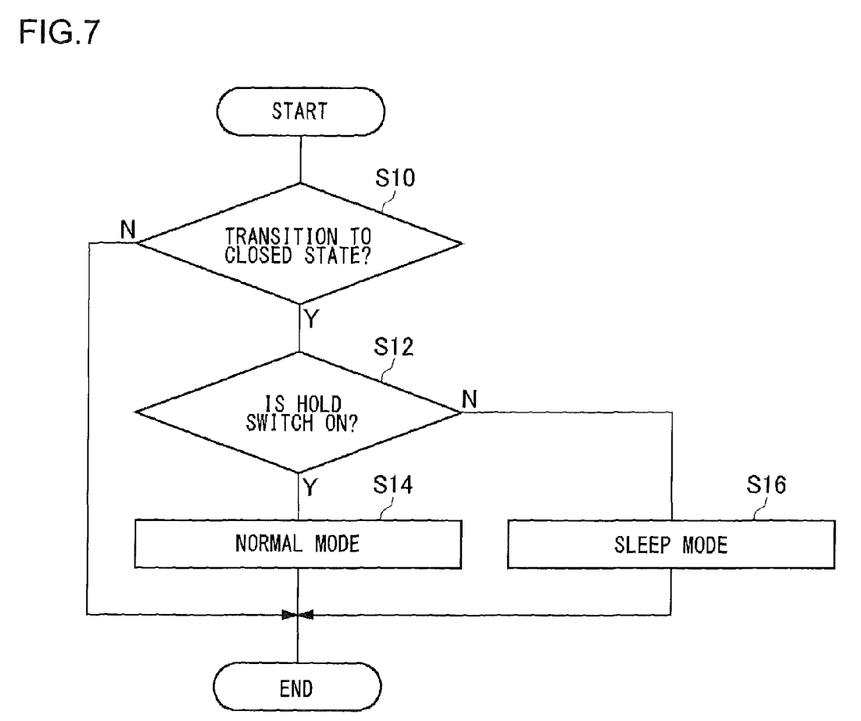
FIG. 7 is a flowchart illustrating control of a transition to a sleep mode of a main CPU.

FIG. 7 is a flowchart illustrating control of a transition to the sleep mode of the main CPU 100. As described above, it is assumed that the information of the electronic device 10, in which the electronic device 10 is set to enter the sleep mode when the electronic device is closed, is set in this control flow. The transition information reception unit 206 monitors the arrival of transition information from the opening/closing detection unit 220 (S10). If transition information is not output from the opening/closing detection unit 220 (N in S10), the control flow is not executed. When the transition information reception unit 206 receives transition information indicating that the transition from the open state to the closed state has occurred (Y in S10), the transition information reception unit 206 determines how the transition information is to be treated according to whether the hold switch 50 is in the ON state or in the OFF state (S12).

If the hold switch 50 is in the OFF state (N in S12), the transition information reception unit 206 enables the reception of the transition information, and the electrical-power control unit 210 switches the operation mode of the main CPU 100 from the normal mode to the sleep mode (S16). On the other hand, if the hold switch 50 is in the ON state (Y in S12), the transition information reception unit 206 disables the reception of the transition information, and the electrical-power control unit 210 does not switch the operation mode of the main CPU 100 from the normal mode to the sleep mode and maintains the normal mode (S14). With this, the control of the operation mode of the main CPU 100 is completed.

Described above is an explanation based on the exemplary embodiments of the present invention. These exemplary embodiments are intended to be illustrative only, and it will be obvious to those skilled in the art that various modifications to constituting elements and processes could be developed and that such modifications are also within the scope of the present invention.

In the embodiment, an explanation has been given of the electrical-power control according to the operation state of the hold switch 50 when the information of the electronic device 10, in which the electronic device 10 is set to enter the sleep mode when the electronic device is closed, is set. In an exemplary variation, the application processing unit 104 controls the execution of an application according to the operation state of the hold switch 50 when the information of the electronic device 10, in which the electronic device 10 is set to enter the "STANDARD" mode when the electronic device is closed, is set.

As shown in the embodiment, when the "STANDARD" setting item is selected, the application processing unit 104 executes an application for displaying a clock showing the current time information on the display 23 at the time when the electronic device 10 is changed from the open state to the closed state. In the exemplary variation, the transition information reception unit 206 may disable the reception of transition information when the hold switch 50 is in the ON state so that the application processing unit 104 may not execute the application when the electronic device 10 transitions from the open state to the closed state.

When the electronic device 10 transitions from the open state to the closed state and when the hold switch 50 is turned ON while the application processing unit 104 is executing an application for displaying a clock on the display 23, the application processing unit 104 may continue executing the application even when the electronic device 10 transitions from the closed state to the open state. The application processing unit 104 does not recognize the transition from the closed state to the open state and continues to display the clock on the display 23 by disabling the reception of transition information by the transition information reception unit 206. Since the hold switch 50 is in the ON state at this time, a key operation on the operation keys is disabled. However, the operation input reception unit 204 may receive, as a valid operation, operation on the operation keys that is necessary for setting the clock, for example, time adjustment.

In the embodiment, the hold switch 50 is used as an operation switch for a user to set operation mode control. However, an operation switch for a user to set operation mode control may be provided separately from the hold switch 50.

In the embodiment, the electronic device 10 is shown in which the upper housing 20 and the lower housing 30 are connected slidably in parallel in a straight direction. However, the upper housing 20 and the lower housing 30 may be connected slidably in a rotational direction.

DESCRIPTION OF THE REFERENCE NUMERALS

10 electronic device
20 upper housing
23 display
30 lower housing
50 hold switch
100 main CPU
102 menu processing unit
104 application processing unit
200 system controller
202 setting information storage unit
204 operation input reception unit
206 transition information reception unit
208 hold-state value reception unit
210 electrical-power control unit
212 communication processing unit
220 opening/closing detection unit The present invention can be applied to an electronic device field.

The invention claimed is:

1. An electronic device provided with an upper housing and a lower housing, wherein the upper housing and the lower housing are slidably connected via a slide mechanism such that an operation key provided on a front face of the lower housing can be in at least two states: an open state where the operation key is exposed to the outside; and a closed state where the operation key is not exposed to the outside, comprising:

an opening/closing detection unit configured to detect a transition of the state of the electronic device;
an application processing unit configured to execute an application;
an electrical-power control unit configured to set an operation mode of the application processing unit; and
an operation switch configured to be operated by a user, said operation switch is a physical switch located on a side face of the lower housing, thereby providing easy access to the switch regardless of whether the device is an open state, closed state, face up, or face down,
wherein when a transition from the open state to the closed state is detected while the operation switch is in an OFF state, the electrical-power control unit switches the operation mode of the application processing unit from a normal mode to a sleep mode, and when a transition from the open state to the closed state is detected while the operation switch is in an ON state, the electrical-power control unit does not switch the operation mode of the application processing unit from the normal mode to the sleep mode, thereby allowing any application, including a game, to continue running in the closed state, and
wherein said slide mechanism allows the upper housing and lower housing to slidably converge or diverge along parallel planes.

2. The electronic device according to claim 1, wherein the operation switch is a hold switch for indicating that reception of an operation input through the operation key is disabled when the operation switch is in the ON state.

3. The electronic device according to claim 1, wherein the normal mode is an operation mode where electrical power is supplied to the application processing unit and the application processing unit executes a predetermined application, and wherein the sleep mode is an operation mode where the electrical power supply to the application processing unit is stopped.

4. The electronic device according to claim 3, wherein the application processing unit executes an application that displays on a display a clock in which current time information is shown when transition to a closed state from an opened state is detected when the application processing unit is in normal mode.

5. The electronic device according to claim 3 wherein the application processing unit does not execute the predetermined application if transition to a closed state from an opened state is detected when the normal mode is chosen and the operation switch in an ON state.

6. The electronic device according to claim 3, wherein the application processing unit continues executing the predetermined application even if the electronic device changes from a closed state to an opened state if the operation switch is in an ON state.

* * * * *